United States Patent Office.

HEINRICH BAUM, OF HÖCHST-ON-THE-MAIN, GERMANY, ASSIGNOR TO FARB-WERKE, VORMALS MEISTER, LUCIUS & BRÜNING, OF SAME PLACE.

DYE-STUFF OR COLORING-MATTER.

SPECIFICATION forming part of Letters Patent No. 251,162, dated December 20, 1881.

Application filed November 2, 1881. (Specimens.)

*To all whom it may concern:*

Be it known that I, HEINRICH BAUM, a citizen of Germany, residing at Höchst-on-the-Main, Germany, have invented new and useful Improvements in Dye-Stuffs or Coloring-Matters, of which the following is a specification.

The object of this invention is the manufacture of a yellow-orange coloring-matter from the disulpho-betanaphtholic natrium salt soluble in alcohol by means of the diazo compound derived from aniline.

To produce the disulpho-betanaphtholic acid, one part of beta-naphthol is mixed with three parts of sulphuric acid, the mixture being heated for twelve hours at a temperature of 212° to 230° Fahrenheit. Two isomere disulpho-betanaphtholic acids are thereby obtained, from which the soda salts are easily separated by being digested with three or four parts of alcohol, the salt that is insoluble in alcohol being filtered and dried, while the soluble salt is extracted by evaporation and dried. The soluble salt is used for producing the coloring-matter being the object of this invention.

To obtain the coloring-matter, six and one-half parts of aniline are dissolved in twelve parts of muriatic acid (specific gravity 1.16 to 1.18) and one hundred parts of water, to which are added four and one-half parts of pure nitrite of potash. This solution is added to twenty pounds of the above-described disulpho-beta-naphtholic salt dissolved in two hundred parts of water and ten parts of ammonia, (ten per cent.,) when the coloring-matter precipitates in the form of a paste. The latter is dissolved, precipitated with common salt, and dried. A powder is thereby obtained which will dye wool or silk a yellow-orange shade that will stand light and soaping.

My coloring-matter dissolves in concentrated sulphuric acid with an orange-red color. Treated with tin and muriatic acid, a precipitate of crystallized hydrochlorate of aniline is obtained, while the solution contains an easily soluble beta-amido-naphthol disulpho-acid.

I do not limit myself to the exact proportions, as they may be varied without departing from the principle of my invention.

What I claim as new, and desire to secure by Letters Patent, is—

1. As a new article of manufacture, a yellow orange coloring-matter having the characteristics above set forth.

2. The within-described process for producing a coloring-matter or dye-stuff by the reaction of the disulpho-betanaphtholic sodium salt soluble in alcohol upon the diazoic derivative of aniline, substantially as set forth.

In testimony whereof I have hereunto set my hand and seal in the presence of two subscribing witnesses.

HEINRICH BAUM. [L. S.]

Witnesses:
FERDINAND VOGELER,
GOTTFRIED RADERMACHER.